C. W. MANZEL.
CLEANING IMPLEMENT FOR LUBRICATING NIPPLES.
APPLICATION FILED SEPT. 13, 1920. RENEWED NOV. 18, 1921.
1,420,123. Patented June 20, 1922.
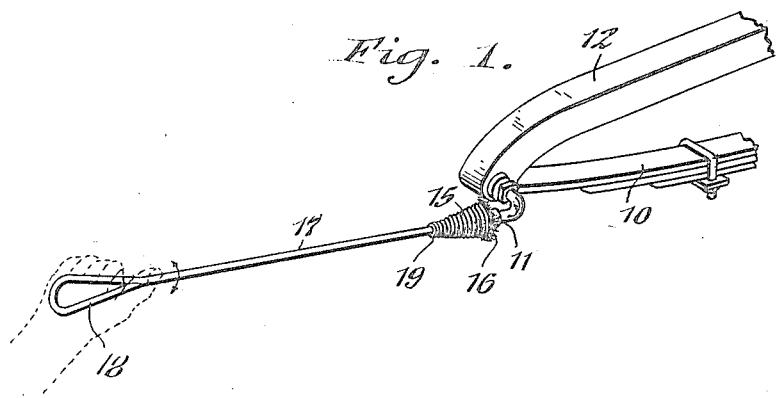
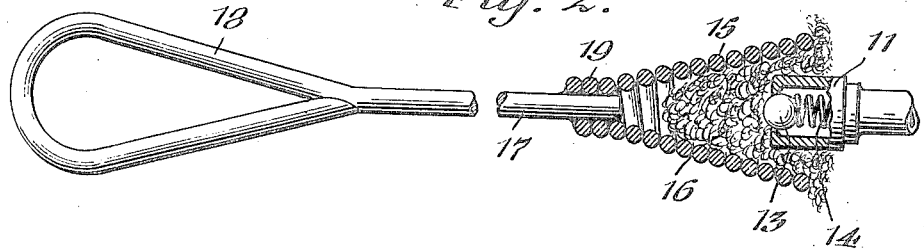
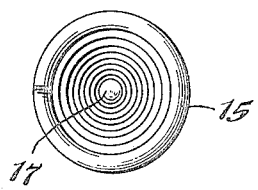
Inventor,
Charles W. Manzel
by Geyer Popp
Attorneys.

UNITED STATES PATENT OFFICE.

CHARLES W. MANZEL, OF BUFFALO, NEW YORK.

CLEANING IMPLEMENT FOR LUBRICATING NIPPLES.

1,420,123.  Specification of Letters Patent.  Patented June 20, 1922.

Application filed September 13, 1920, Serial No. 410,050. Renewed November 18, 1921. Serial No. 516,249.

*To all whom it may concern:*

Be it known that I, CHARLES W. MANZEL, a citizen of the United Sates, residing at Buffalo, in the county of Erie and State of New-York, have invented new and useful Improvements in Cleaning Implements for Lubricating Nipples, of which the following is a specification.

In the lubricating systems recently adopted, particularly for the bearings, springs and other parts of automobiles, individual nipples are applied to these parts through which the lubricant, either in the form of oil or grease, is forced by a so-called "gun" or force pump, each nipple being provided with a spring-pressed check-valve for excluding dust therefrom.

It is the object of my invention to provide a simple and inexpensive implement by which the various lubricating nipples can be quickly and conveniently wiped off or cleaned, preparatory to forcing the lubricant through them, so as to prevent the passage of dust or other foreign particles into the bearings with the lubricant.

In the accompanying dawings:

Figure 1 is a pespective view of one form of the implement, showing its application to the lubircating nipple of a vehicle spring. Figure 2 is an enlarged sectional elevation of the device. Figure 3 is a front view thereof.

Similar characters of reference indicate corresponding parts throughout the several views.

10 indicates a leaf spring of an automobile or other vehicle, and 11 a lubircating nipple for the bolt, not shown, which connects the end of the spring to the frame member 12. Normally closing the mouth of this nipple is an inwardly-opening check-valve 13 which is pressed against its seat by a spring 14.

In lubricating said bolt, the delivery end of the gun or force pump is passed over and pressed against the end of the nipple 11, and upon advancing the pump-plunger the resulting pressure opens the check valve and forces the lubricant through the nipple and upon the bolt.

These nipples are usually exposed and become covered with dust, and it is obviously important to remove this dust before injecting the lubricant, otherwise it will be carried into the bearing or other part and cause rapid wearing thereof. The cleaning implement shown in the drawings is very efficient and convenient for this purpose and comprises a hood or socket 15 of suitable dimensions to pass over the head of the nipple 11 and adapted to contain a plug, filling or lining of cotton waste 16 or other appropriate cleaning material which envelops the nipple head and whereby the latter is thoroughly cleaned upon rotating or oscillating said head thereon. For this purpose, the socket has a comparatively long and slender handle-rod or stem 17 terminating in a comfortable handle 18, so that the user can conveniently reach and clean the various lubricating nipples of an automobile or other mechanism without going under the car and without soiling the hands or the clothing.

The socket 15 is preferably of conical or tapering form and provided with a cylindrical shank 19 which is soldered or otherwise secured upon the handle-stem 17. In the embodiment illustrated in Figs. 1, 2 and 3, the socket consists of a wire coil with its convolutions arranged closely together. This construction renders the socket flexible or elastic and permits it to yield laterally and adapted itself to a lubricating nipple whose head may be more or less out of line with the handle-stem.

In the use of the invention herein shown and described, a plug of waste material is thrust into the socket and the latter is then passed over the lubricating nipple and turned back and forth by means of its handle, thus thoroughly cleaning the nipple before delivering a charge of lubricant into it and keeping the lubricant clean, with the result that no dust is carried into the parts equipped with such nipples and their life is lenthened.

The implement comprises but two parts and can therefore be manufactured at small cost.

I claim as my invention:

1. A cleaning implement of the character described, comprising a flexible, laterally yielding socket of sufficient internal diameter to pass over a lubricating nipple and adapted to receive a plug of cleaning material, and a handle-rod arranged in axial alinement with said socket and extending from the rear end thereof.

2. A cleaning implement of the character described, comprising a hollow wire coil of conical form constructed to fit with its large end over a lubricating nipple and adapted to receive a plug of cleaning material, and a handle-rod extending from the small rear end of said coil and arranged in axial alinement therewith.

3. A cleaning implement of the character described, comprising a handle-rod, a conical socket having a cylindrical shank secured to the front end of said handle-rod, said socket being in axial alinement with said handle and adapted to receive a plug of cleaning material and the socket and its shank consisting of a flexible wire coil to permit said handle to be bent out of alinement relatively to said socket.

CHARLES W. MANZEL.